(12) United States Patent
Liu et al.

(10) Patent No.: US 12,043,179 B2
(45) Date of Patent: Jul. 23, 2024

(54) VEHICULAR PRISMATIC INTERIOR REARVIEW MIRROR ASSEMBLY WITH DRIVER MONITORING CAMERA

(71) Applicant: Magna Electronics Inc., Auburn Hills, MI (US)

(72) Inventors: Zhongyao Liu, Troy, MI (US); Justin E. Sobecki, Rockford, MI (US); Jonathan D. Conger, Huntington Woods, MI (US); Steven V. Byrne, Goodrich, MI (US); Austen C. Peterson, Hudsonville, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 64 days.

(21) Appl. No.: 18/057,849

(22) Filed: Nov. 22, 2022

(65) Prior Publication Data

US 2023/0158955 A1 May 25, 2023

Related U.S. Application Data

(60) Provisional application No. 63/264,444, filed on Nov. 23, 2021.

(51) Int. Cl.
| | | |
|---|---|---|
| *G02B 7/18* | (2021.01) | |
| *B60R 1/04* | (2006.01) | |
| *B60R 1/12* | (2006.01) | |
| *G02B 7/182* | (2021.01) | |
| *G02B 27/00* | (2006.01) | |

(Continued)

(52) U.S. Cl.
CPC ................ *B60R 1/12* (2013.01); *B60R 1/04* (2013.01); *G02B 7/182* (2013.01); *G02B 27/0025* (2013.01); *H04N 7/18* (2013.01); *H04N 23/21* (2023.01); *H04N 23/55* (2023.01);

(Continued)

(58) Field of Classification Search
CPC .............................................. B60R 2001/1253
See application file for complete search history.

(56) References Cited

U.S. PATENT DOCUMENTS

| | | | |
|---|---|---|---|
| 2008/0310005 A1* | 12/2008 | Tonar | B60R 1/085 |
| | | | 359/265 |
| 2009/0040778 A1* | 2/2009 | Takayanagi | H04N 7/183 |
| | | | 362/494 |

(Continued)

*Primary Examiner* — Frank Johnson
(74) *Attorney, Agent, or Firm* — HONIGMAN LLP

(57) ABSTRACT

A vehicular interior rearview mirror assembly includes a mirror head adjustably attached at a mounting base. The mirror head includes a prismatic mirror reflective element having a wedge-shaped, reflector-coated glass substrate having a front side and a rear side separated by a thickness of the glass substrate, with the thickness of the glass substrate varying between a lower edge region of the glass substrate and an upper edge region of the glass substrate. A driver monitoring camera is accommodated by the mirror head and views through the prismatic mirror reflective element. A refraction-compensating element is disposed between a lens of the driver monitoring camera and the rear side of the glass substrate of the prismatic mirror reflective element. The refraction-compensating element is a wedge-shaped element that offsets refraction of light that passes through the wedge-shaped, reflector coated glass substrate of the prismatic mirror reflective element.

30 Claims, 4 Drawing Sheets

(51) Int. Cl.
  *H04N 7/18*     (2006.01)
  *H04N 23/21*    (2023.01)
  *H04N 23/55*    (2023.01)
  *H04N 23/56*    (2023.01)
  *H04N 23/695*   (2023.01)

(52) U.S. Cl.
  CPC ........... *H04N 23/56* (2023.01); *H04N 23/695* (2023.01); *B60R 2001/1253* (2013.01)

(56) References Cited

U.S. PATENT DOCUMENTS

| | | | |
|---|---|---|---|
| 2009/0135493 A1* | 5/2009 | Takayanagi | B60R 1/12 359/630 |
| 2011/0188122 A1* | 8/2011 | Habibi | B60R 1/04 359/604 |
| 2016/0221509 A1* | 8/2016 | Takada | B60R 1/088 |
| 2022/0229309 A1* | 7/2022 | Laskin | G02B 26/0816 |

\* cited by examiner

VEHICULAR PRISMATIC INTERIOR REARVIEW MIRROR ASSEMBLY WITH DRIVER MONITORING CAMERA

CROSS REFERENCE TO RELATED APPLICATION

The present application claims the filing benefits of U.S. provisional application Ser. No. 63/264,444, filed Nov. 23, 2021, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A vehicular prismatic interior rearview mirror assembly has a driver monitoring camera (and optionally a near infrared light emitter) disposed at the mirror head so as to move in tandem with the mirror head when the mirror head is adjusted relative to an interior portion of the vehicle to adjust the driver's rearward view. The camera views the interior cabin of the vehicle through the mirror reflective element and views the driver region and/or passenger region of the interior cabin of the vehicle. The mirror reflective element comprises a prismatic mirror reflective element having a wedge-shaped, reflector-coated glass substrate having a front side and a rear side separated by a thickness of the glass substrate. The thickness of the glass substrate varies between a lower edge region of the glass substrate and an upper edge region of the glass substrate (e.g., the lower edge region is thinner than the upper edge region). The driver monitoring camera comprises a lens and an imager and views through the mirror reflective element. A compensation element is disposed between the lens of the driver monitoring camera and the rear side of the glass substrate of the mirror reflective element. The compensation element comprises a wedge-shaped element that offsets refraction of light caused by the wedge-shaped, reflector coated glass substrate of the prismatic mirror reflective element.

These and other objects, advantages, purposes and features of the present invention will become apparent upon review of the following specification in conjunction with the drawings.

DESCRIPTION OF THE PREFERRED EMBODIMENTS

Figure 1:
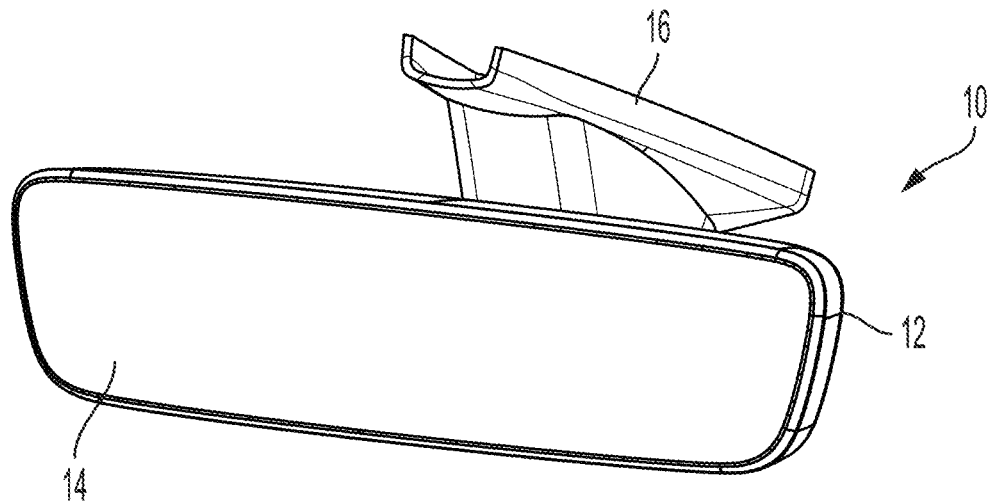
FIG. 1 is a perspective view of an interior rearview mirror assembly having a driver monitoring camera and a near infrared light emitter.
Figure 2:
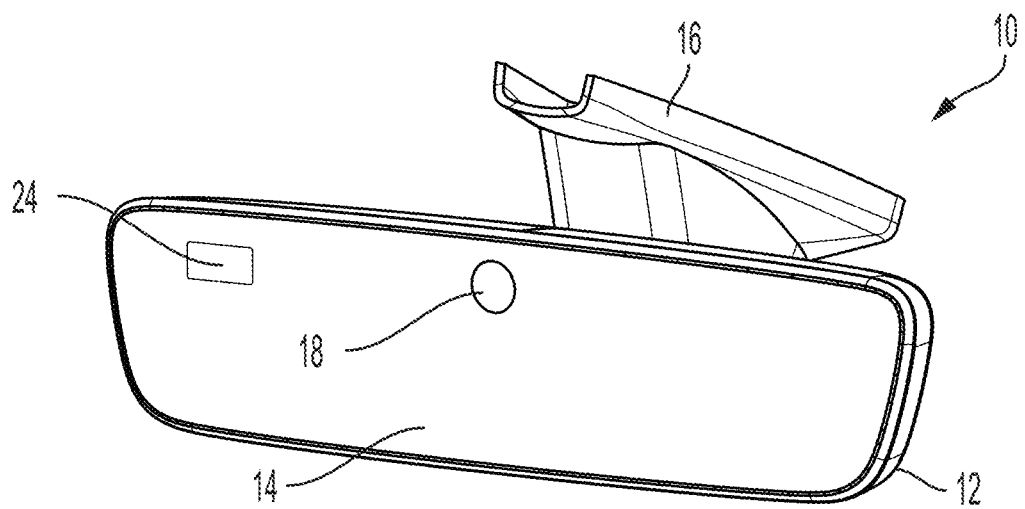
FIG. 2 is another perspective view of the interior rearview mirror assembly, showing the DMS camera and light emitters behind the reflective element.
Figure 3:
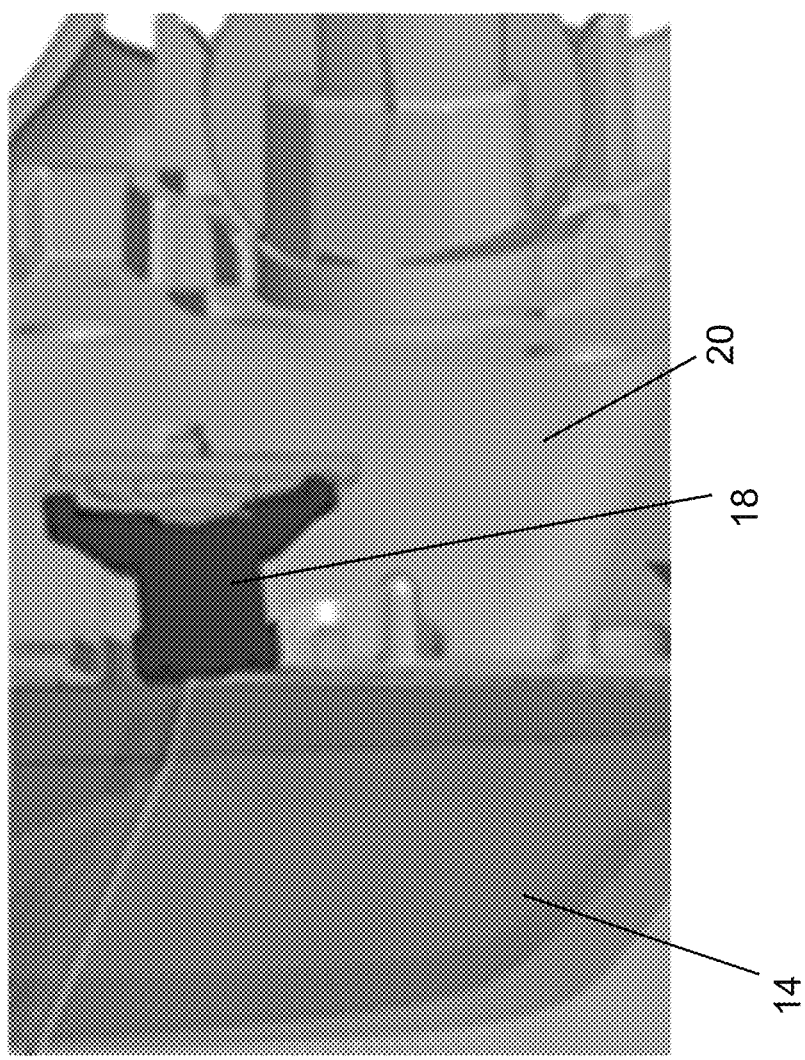
FIG. 3 is a perspective and partial sectional view of a mirror head having a prismatic reflective element.

Referring now to the drawings and the illustrative embodiments depicted therein, an interior rearview mirror assembly 10 for a vehicle includes a casing 12 and a reflective element 14 positioned at a front portion of the casing 12 (FIG. 1). The mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a prismatic mirror reflective element 14 having a wedge-shaped mirror reflector-coated glass element or substrate 14a that is flipped (such as via a toggle mechanism) between a daytime viewing orientation and a nighttime viewing orientation.

The mirror assembly 10 includes or is associated with a driver monitoring system (DMS), with the mirror assembly comprising a driver/occupant monitoring camera 18 disposed at a back plate 20 behind the reflective element 14 and viewing through the reflective element 14 toward at least a head region of the driver of the vehicle. The DMS may also include a near infrared light emitter 24 disposed at the back plate and emitting light through another aperture of the back plate and through the reflective element and configured to move in tandem with the mirror head. The near infrared light emitter 24 may comprise any suitable near infrared light-emitting light source, such as, for example, a near infrared light-emitting light emitting diode (LED) or a near infrared light-emitting vertical cavity surface-emitting laser (VC-SEL) or the like, that, when electrically powered to emit light, emits near infrared light. The mirror assembly and/or driver monitoring system may utilize aspects of the mirror assemblies and systems described in International Publication Nos. WO 2022/241423 and/or WO 2022/187805, which are hereby incorporated herein by reference in their entireties.

The mirror assembly 10 includes a printed circuit board (PCB) having a control or control unit comprising electronic circuitry (disposed at the circuit board or substrate in the mirror casing), which includes a processor that processes image data captured by the camera 18 for monitoring the driver and determining, for example, driver gaze direction, driver attentiveness, and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The interior rearview mirror thus has embedded cameras, infrared (IR) or near infrared light emitters or illuminators and the processor for processing captured image data for the driver monitoring application. The inward facing camera 18 and IR illuminators 24 are fixed within the mirror head, and thus both components are coupled with the mirror body. Hence, the camera's field of view is subject to change from driver to driver as the mirror head is adjusted to set the driver's preferred rearward view.

The mirror reflector coating of the prismatic mirror reflective element 14 transmits near infrared light and reflects visible light. Thus, the prismatic mirror reflective element (i.e., a transflective mirror reflector of the mirror reflective element) effectively allows IR emitters to emit light through the reflective element and allows the camera to 'view' through the mirror reflective element, while allowing the mirror reflective element to reflect at least some visible light incident thereat to serve its intended rear viewing purpose. The IR emitters may be activated and electrically powered to emit light responsive at least in part to an ambient light level within the vehicle cabin and at the driver's head region, with the light level being determined by a light sensor or by processing of image data captured by the driver monitoring camera.

Figure 4B:
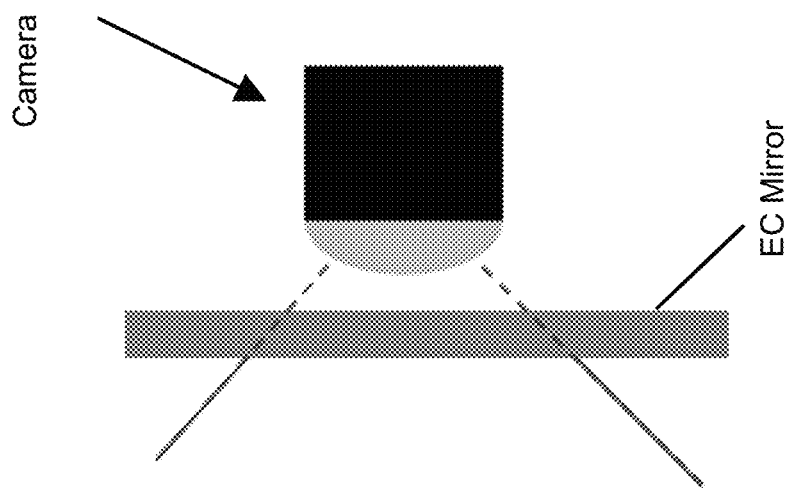
FIGS. 4A and 4B are schematics showing how light is refracted when passing through an electrochromic mirror (FIG. 4A) to the camera and when passing through a prismatic mirror (FIG. 4B) to the camera.
Figure 4A:
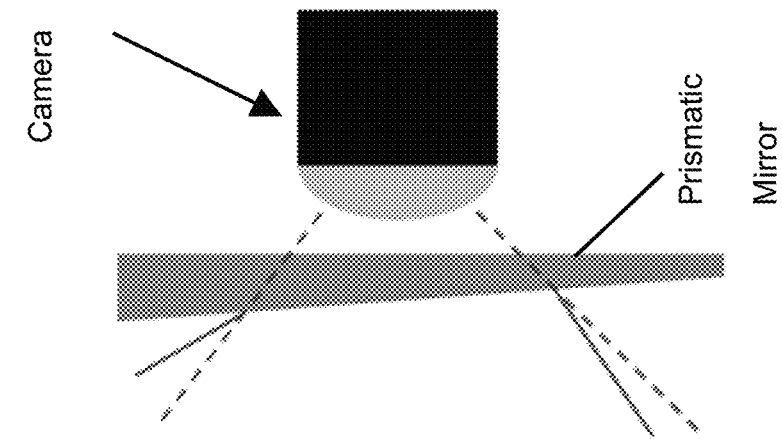

The wedge-shaped, reflector-coated glass substrate of the mirror reflective element poses challenges to image quality due to refraction of light as it passes through the mirror reflector and wedge-shaped glass substrate. For example, as can be seen with reference to FIGS. 4A and 4B, light received at the lens of the camera (and thus imaged by the imager of the camera) is refracted as it passes through the prismatic mirror reflective element 14 (FIG. 4B), such that the camera images different images as compared to light that passes through an electro-optic (e.g., electrochromic) mirror reflector (FIG. 4A) and that is received at a lens of a camera (and thus imaged by the imager of the camera). In other words, the camera disposed behind and viewing through the electrochromic mirror reflective element has a symmetric field angle, while the camera disposed behind and viewing through the prismatic mirror reflective element has an asymmetric field angle. The prismatic mirror reflective element may generate image quality drop and system field angle change (i.e., the camera may have a reduced field of view).

Figures 5, 6:
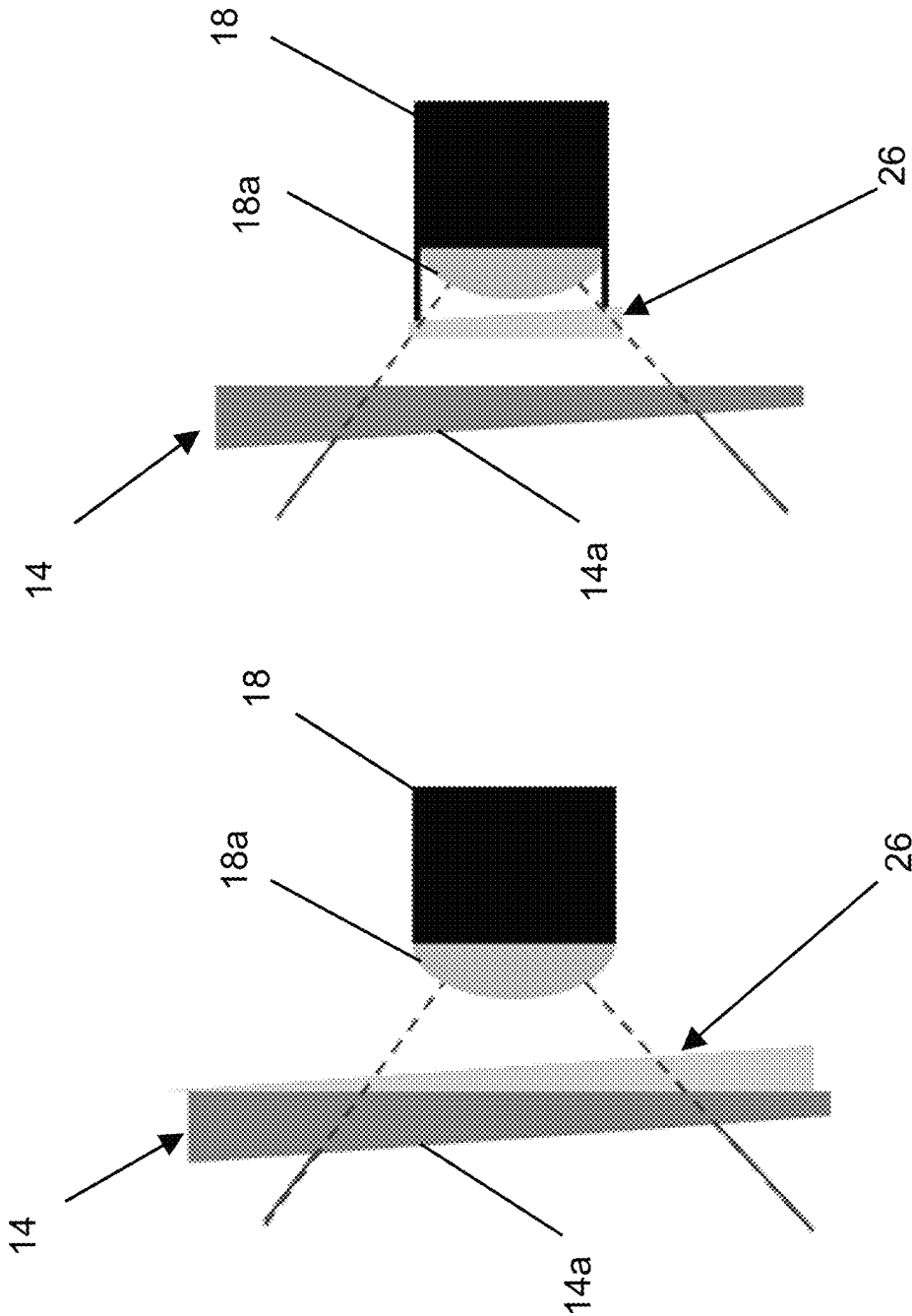
FIG. 5 is a schematic of a camera at a prismatic mirror, with a compensation prism disposed at the rear side of the prismatic mirror.
FIG. 6 is a schematic of a camera at a prismatic mirror, with a compensation prism disposed at the camera.

The system thus includes a refraction-compensating element or compensation prism or element 26 disposed between the camera lens 18a and the prismatic mirror reflective element 14 (FIGS. 5 and 6). The compensation prism may be part of the mirror reflective element or it may be part of the camera (such as part of the lens assembly or lens holder of the camera). For example, and such as shown in FIG. 5, the compensation prism 26 may be disposed between the camera lens and the prismatic mirror reflective element and located at or attached at the rear side of the mirror reflective element. Optionally, and such as shown in FIG. 6, the compensation prism 26 may be disposed between the camera lens and the prismatic mirror reflective element and located at or attached at the camera (such as at the end of the lens barrel or lens holder of the camera) so as to be disposed at the outermost lens optic of the camera lens.

The compensation prism 26 comprises a wedge-shaped element (e.g., a wedge-shaped glass element or a wedge-shaped plastic or polycarbonate element or the like) that compensates or offsets the refraction of light that passes through the prismatic mirror reflective element 14. For example, a lower edge region of the glass substrate of the prismatic mirror reflective element 14 is thinner than the upper edge region of the glass substrate 14a of the prismatic mirror reflective element, such that a lower edge region of the compensation element 26 is thicker than an upper edge region of the compensation element 26 to cooperate with or offset or counter the wedge-shape of the glass element 14a of the prismatic mirror reflective element 14. The compensation prism 26 may be formed with a similar angle between its front and rear sides as the angle between the front and rear sides of the wedge-shaped glass element of the prismatic mirror reflective element 14, such that, when flipped upside down (as compared to the prismatic mirror reflective element), the compensation prism 26 compensates or offsets the prismatic mirror reflective element 14, such that the camera images light passing through the prismatic mirror reflective element 14 and the compensation prism 26 and within the desired field of view of the camera. In other words, when disposed between the prismatic mirror reflective element 14 and the camera, the rear side of the compensation element 26 may be generally parallel to the front side of the prismatic mirror reflective element 14 and the front side of the compensation element 26 may be generally parallel to the rear side of the prismatic mirror reflective element 14, such that the combination of the compensation element 26 and the prismatic mirror reflective element 14 (when the compensation element 26 is disposed at or attached to the rear side of the prismatic mirror reflective element 14 such as shown in FIG. 5) is a non-wedge shaped laminate structure.

With the compensation prism 26, the prismatic mirror reflective element 14 will not block or change camera's field of view, the system will have improved system image quality, and the compensation prism 26 corrects unsymmetrical system distortion that may otherwise occur due to light passing through the prismatic mirror reflective element 14. Thus, light passing through the prismatic mirror reflective element 14 toward the camera is refracted and the light is then refracted in an opposite direction when passing through the compensation element 26 to compensate or accommodate the refraction of light caused by the wedge-shaped, reflector coated glass substrate 14a of the prismatic mirror reflective element 14. The camera disposed behind and viewing through the prismatic mirror reflective element 14 and compensation element 26 thus has a symmetric field angle.

Having the inward viewing driver monitoring camera in a pivotable rearview mirror head poses unique challenges pertaining to the camera's perspective. In order to account for changes in the camera's view when the mirror head is adjusted, the mirror's driver monitoring processor calculates the camera's location and angle within the vehicle based on the image data captured by the camera and processed by the processor. For example, the system may process image data captured by the driver monitoring camera to determine where particular features are located in the field of view of the camera (such as relative to a particular area of the field of view, such as a central region), and thus the driver monitoring system determines the position of the driver's head by the determined position or positions of particular fixed vehicle features, such as the rear windows, pillars, center console or the like, in the captured image data. The system may adjust processing of the image data captured by the camera to accommodate changes in location of the known or particular vehicle features. For example, if a nominal setting of the mirror has a particular feature a predetermined distance laterally and/or vertically from a center of the image data, if it is determined that the particular feature is shifted or offset to one side or the other from the predetermined distance location, the processor shifts or adjusts processing of captured image data to accommodate the lateral and/or vertical shift of the particular feature. Optionally, the field-of-view of the camera may be biased by offsetting/shifting the lens stack of the camera relative to the imager rather than physically aiming the whole Imager PCB and lens stack. Such shifting of the lens relative to the imager may utilize aspects of the systems described in U.S. Pat. Nos. 10,946,798 and/or 10,525,883, which are hereby incorporated herein by reference in their entireties.

The driver monitoring system may provide the ability for the algorithms/camera to determine if the driver has the mirror aimed properly (for providing an acceptable rearward view to the particular driver). Such determination may be made by determining (via processing of image data captured by the camera) the presence and position of (i) the driver's face in a given frame, (ii) adequate light in a given frame relative the driver's head mass, or (iii) the rear window and/or other fixed vehicle features (e.g., D pillars or head rests or the like) in the field of view of the camera. If the system determines that the mirror is aimed improperly, the algorithms may trigger the vehicle to alert the driver of improper use of the interior rearview mirror (such as via an audible alert, or such as via a visual alert, such as an indicator light or display on a display screen, or such as via a haptic alert). Optionally, the mirror may include an actuator that may adjust the mirror head toward a nominal or optimal orientation for the particular driver responsive to determining that the mirror head is aimed improperly for that driver.

Optionally, and to reduce stray light or glare at the camera, the mirror head may include a stray light limiting or blocking mechanism. In a DMS/OMS mirror head, the camera lens and the light emitters are closely placed. The camera has a wide angle field of view such as, for example, a horizontal field of view 140 degrees and a diagonal field of view of close to 180 degrees. Stray light emitted by the light emitters (when electrically powered to emit near infrared light) may leak into the camera lens directly or through reflections from the cover glass or prism glass or EC mirror glass surfaces and create glare/ghost in the captured images. The stray light blocking mechanism is disposed between the camera lens and the glass surface in front of the lens. The stray light blocker may circumscribe the lens engage the rear of the mirror reflective element and block light from entering the lens. The stray light blocker may be in the form of a hard shell cone attached to the lens cap or barrel, or a soft shell (e.g., a flexible or deformable rubber disc-shaped or cone-shaped element) as a part of lens cap/barrel formed by second-shot injection molding or other appropriate means. The stray light blocker may utilize aspects of the elements and systems described in International Publication Nos. WO 2022/241423 and/or WO 2022/187805, which are hereby incorporated herein by reference in their entireties.

Optionally, the DMS camera may be used to detect ambient light and/or glare light (emanating from headlamps of a trailing vehicle) for use in providing auto-dimming of the EC mirror reflective element. The DMS camera may be disposed in the mirror head and viewing rearward through the mirror reflective element. The processing of image data captured by the DMS camera may be adjusted to accommodate the angle of the mirror head so that the ECU or system, via image processing of image data captured by the DMS camera, determines headlamps of a trailing vehicle (behind the equipped vehicle and traveling in the same direction as the equipped vehicle and traveling in the same traffic lane or in an adjacent traffic lane) to determine glare light at the mirror reflective element. The processing of image data captured by the DMS camera is adjusted to accommodate the degree of dimming of the mirror reflective element. For example, the system knows how much the mirror reflective element is dimmed (responsive to the determined glare light intensity and location) and can accommodate for the mirror dimming level when processing captured image data to determine presence and intensity of light sources/headlamps rearward of the vehicle. The intelligent/automatic mirror dimming functions may utilize aspects of the systems described in U.S. Pat. Nos. 10,948,798 and/or 10,967,796, and/or International Publication No. WO 2022/150826, which are all hereby incorporated herein by reference in their entireties.

With prismatic mirror applications, there may be an issue with 'ghost' images getting into the camera lens caused by the non-parallel surfaces of the prism glass. Another issue may be with the IR light from the IR LEDs/VCSELS bouncing between the prism glass surfaces and getting to the camera lens. The system may provide optimization of the camera primary aim axis to an angle specific to the second surface or first surface. For example, the camera lens axis may be perpendicular to the second (rear) surface of the mirror glass substrate and then the resulting prism angle from the first (front) surface of the mirror glass substrate, or it may be angled such that the primary axis is perpendicular to the first surface, or it may be in between or further off the perpendicular axis. This optimization is possible by shifting the imager relative to the lens stack, which provides an optical bias aim of the camera's field of view. Optionally, an area in front of the camera lens or IR illumination area may be devoid of the mirror reflector (such as a window established through the mirror reflector by laser ablating the mirror reflector) to reduce the reflections between the surfaces.

Optionally, a coating, such as an anti-reflective coating, may be disposed at the first surface to reduce the reflections and promote more light exiting the prism glass or higher transmission by utilizing phase changes. Such anti-reflection coatings reduce the light loss and make use of phase changes and the dependence of the reflectivity on the index of refraction of the glass mirror substrate. The anti-reflection coatings create a double interface via a thin film that provides two reflected waves. If the waves are out of phase they at least partially cancel one another. For example, the coating may have a quarter wavelength thickness and the coating may have an index of refraction of less than that of the glass mirror substrate, such that the two reflections will be 180 degrees out of phase and will cancel each other out. The mirror reflective element and coating(s) and/or driver monitoring system may utilize aspects of the mirror reflective element and coating(s) and systems described in International Publication Nos. WO 2022/241423 and/or WO 2022/187805, which are hereby incorporated herein by reference in their entireties.

The driver monitoring system, including the cameras and processor, may utilize aspects of the systems described in U.S. Pat. Nos. 11,465,561; 11,205,083; 11,341,671; 11,167,771; 10,703,204; 10,906,463; 10,247,941; 10,946,798; 10,017,114; 10,908,417; 9,701,258; 9,280,202; 10,065,574; 10,017,114; 9,405,120 and/or 7,914,187, and/or U.S. Publication Nos. US-2022-0254132; US-2022-0242438; US-2022-0111857; US-2021-0291739; US-2020-0202151; US-2018-0231976; US-2018-0222414; US-2015-0352953; US-2015-0296135; US-2015-0294169; US-2015-0022664; and/or US-2015-0009010, and/or U.S. patent application Ser. No. 17/663,462, filed May 16, 2022, and/or International Publication Nos. WO 2022/241423 and/or WO 2022/187805, which are all hereby incorporated herein by reference in their entireties.

The mirror assembly may include a mirror actuator that positions the mirror head at a predetermined or preselected or determined orientation relative to the driver's head. The mirror assembly and/or mirror actuator may utilize aspects of the mirror systems described in U.S. Pat. Nos. 9,616,815; 7,722,199 and/or 6,698,905, which are hereby incorporated herein by reference in their entireties. The mirror assembly (such as the mounting base) may be mounted at the in-cabin side of the vehicle windshield or the mirror assembly may be located or attached elsewhere at the vehicle, such as at an overhead console or headliner of the vehicle or the like.

Optionally, the interior mirror assembly comprises a dual-mode interior rearview video mirror that can switch from a traditional reflection mode to a live-video display mode, such as is by utilizing aspects of the mirror assemblies and systems described in U.S. Pat. Nos. 11,214,199; 10,948,798; 10,442,360; 10,421,404; 10,166,924 and/or 10,046,706, and/or U.S. Publication Nos. US-2021-0162926; US-2021-0155167; US-2019-0146297; US-2019-0118717 and/or US-2017-0355312, which are all hereby incorporated herein by reference in their entireties. The electrically operated actuator may provide the memory setting function and may also operate to adjust the mirror head between the reflection mode and video display mode, such as responsive to a user actuatable input in the vehicle or at the mirror assembly (e.g., a toggle or switch or button at the mirror head).

The mirror reflector may comprise any suitable coatings or layers, such as a transflective coating or layer (that is partially transmissive of visible light and/or near infrared light and that is partially reflective of visible light), such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties. The driver monitoring camera may be accommodated in the mirror head and view through the transflective mirror reflector toward the driver's head region and/or the near IR light emitter may be accommodated in the mirror head and emit light that passes through the transflective mirror reflector to illuminate the driver's head region. The transflective mirror reflector may be spectrally tuned so as to transmit or pass a particular spectral band of light (e.g., near infrared light) while reflecting other spectral bands of light (e.g., visible light). The camera may be sensitive to near infrared light, such that the near IR light emitter can, when electrically operated or powered to emit light, emit near IR light that passes through the transflective mirror reflector and the camera may be sensitive to the near IR light that reflects off of the driver's head and passes back through the transflective mirror reflector.

The reflective element and mirror casing are adjustable relative to a base portion or mounting assembly to adjust the driver's rearward 'view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a prismatic reflective element that is disposed at an outer perimeter edge of the mirror casing and with the prismatic substrate having curved or beveled perimeter edges, such as described in U.S. Pat. Nos. 9,174,578; 9,827,913; 8,508,831; 8,730,553; 9,598,016 and/or 9,346,403, which are hereby incorporated herein by reference in their entireties (and with mirrors of such construction are commercially available from the assignee of this application under the trade name INFINITY™ mirror).

Optionally, the mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 9,598,016; 9,346,403; 9,827,913; 8,508,831 and/or 8,730,553, which are hereby incorporated herein by reference in their entireties).

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 7,420,756; 7,338,177; 7,289,037; 7,274,501; 7,255,451; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 9,487,144; 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. No. US-2006-0050018, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 7,965,336; 7,972,045; 5,550,677; 5,670,935; 5,760,962; 6,690,268; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; 7,720,580; 8,446,470; 8,451,107 and/or 9,126,525, and/or U.S. Pat. Pub. No. US-2009-0244361, which are all hereby incorporated herein by reference in their entireties. The imaging sensor or camera may be activated and the display screen may be activated in response to the vehicle shifting into reverse, such that the display screen is viewable by the driver and is displaying an image of the rearward scene while the driver is reversing the vehicle. It is envisioned that the image processor or controller comprises the likes of an EYEQ™ image processing chip available from Mobileye Vision Technologies Ltd. of Jerusalem, Israel, and processes image data captured by the forward viewing camera and the driver monitoring camera (and optionally surround view cameras and/or CMS cameras of the vehicle).

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head adjustable relative to a mounting base, the mounting base configured to attach at an interior portion of a vehicle equipped with the vehicular interior rearview mirror assembly;
   wherein the mirror head comprises a prismatic mirror reflective element;
   wherein the prismatic mirror reflective element comprises a wedge-shaped, reflector-coated glass substrate;
   a driver monitoring camera accommodated by the mirror head, wherein the driver monitoring camera moves in tandem with the mirror head when, with the mounting base attached at the interior portion of the vehicle, the mirror head is adjusted relative to the mounting base to adjust a rearward view of a driver viewing the prismatic mirror reflective element;
   wherein the driver monitoring camera comprises an imager and a lens;
   wherein the driver monitoring camera views through the prismatic mirror reflective element;
   a refraction-compensating element disposed between the lens of the driver monitoring camera and the prismatic mirror reflective element;
   wherein the refraction-compensating element comprises a wedge-shaped element; and
   wherein the refraction-compensating element offsets refraction of light that passes through the wedge-shaped, reflector coated glass substrate of the prismatic mirror reflective element.

2. The vehicular interior rearview mirror assembly of claim 1, wherein light passing through the wedge-shaped, reflector coated glass substrate of the prismatic mirror reflective element toward the driver monitoring camera is refracted in a first direction, and wherein the light is refracted in a second direction when passing through the refraction-compensating element, and wherein the second direction is opposite the first direction.

3. The vehicular interior rearview mirror assembly of claim 1, wherein a lower edge region of the wedge-shaped, reflector coated glass substrate of the prismatic mirror reflective element is thinner than an upper edge region of the wedge-shaped, reflector coated glass substrate of the prismatic mirror reflective element, and wherein a lower edge region of the refraction-compensating element is thicker than an upper edge region of the refraction-compensating element.

4. The vehicular interior rearview mirror assembly of claim 1, wherein a front side of the refraction-compensating element is parallel to a rear side of the wedge-shaped, reflector coated glass substrate of the prismatic mirror reflective element, and wherein a rear side of the refraction-compensating element is parallel to a front side of the wedge-shaped, reflector coated glass substrate of the prismatic mirror reflective element.

5. The vehicular interior rearview mirror assembly of claim 1, wherein the refraction-compensating element is disposed at a rear side of the wedge-shaped, reflector coated glass substrate of the prismatic mirror reflective element.

6. The vehicular interior rearview mirror assembly of claim 1, wherein the refraction-compensating element is disposed at the lens of the driver monitoring camera.

7. The vehicular interior rearview mirror assembly of claim 1, comprising a near infrared light emitter accommodated by the mirror head, wherein the near infrared light emitter moves in tandem with the mirror head.

8. The vehicular interior rearview mirror assembly of claim 7, wherein the near infrared light emitter, when electrically powered to emit light, emits near infrared light that passes through the prismatic mirror reflective element.

9. The vehicular interior rearview mirror assembly of claim 7, wherein the near infrared light emitter, when electrically powered to emit light, emits near infrared light that passes through the refraction-compensating element and the prismatic mirror reflective element.

10. The vehicular interior rearview mirror assembly of claim 1, wherein, with the mounting base attached at the interior portion of the vehicle, a processor processes image data captured by the driver monitoring camera to determine at least one selected from the group consisting of (i) driver attentiveness, (ii) driver drowsiness, and (iii) driver gaze direction.

11. The vehicular interior rearview mirror assembly of claim 1, wherein the driver monitoring camera views through a transflective mirror reflector of the prismatic mirror reflective element.

12. The vehicular interior rearview mirror assembly of claim 1, wherein the interior portion of the vehicle comprises a portion of a windshield at an in-cabin side of the windshield of the vehicle.

13. A vehicular interior rearview mirror assembly, the vehicular interior rearview mirror assembly comprising:
   a mirror head adjustable relative to a mounting base, the mounting base configured to attach at an interior portion of a vehicle equipped with the vehicular interior rearview mirror assembly;
   wherein the mirror head comprises a prismatic mirror reflective element;
   wherein the prismatic mirror reflective element comprises a wedge-shaped, reflector-coated glass substrate;
   a driver monitoring camera accommodated by the mirror head, wherein the driver monitoring camera moves in tandem with the mirror head when, with the mounting base attached at the interior portion of the vehicle, the mirror head is adjusted relative to the mounting base to adjust a rearward view of a driver viewing the prismatic mirror reflective element;

wherein the driver monitoring camera comprises an imager and a lens;

wherein the driver monitoring camera views through the prismatic mirror reflective element;

a refraction-compensating element disposed between the lens of the driver monitoring camera and the prismatic mirror reflective element;

wherein the refraction-compensating element comprises a wedge-shaped element;

wherein the refraction-compensating element offsets refraction of light that passes through the wedge-shaped, reflector coated glass substrate of the prismatic mirror reflective element;

wherein a lower edge region of the wedge-shaped, reflector coated glass substrate of the prismatic mirror reflective element is thinner than an upper edge region of the wedge-shaped, reflector coated glass substrate of the prismatic mirror reflective element, and wherein a lower edge region of the refraction-compensating element is thicker than an upper edge region of the refraction-compensating element; and wherein, with the mounting base attached at the interior portion of the vehicle, a processor processes image data captured by the driver monitoring camera to determine at least one selected from the group consisting of (i) driver attentiveness, (ii) driver drowsiness, and (iii) driver gaze direction.

14. The vehicular interior rearview mirror assembly of claim 13, wherein light passing through the wedge-shaped, reflector coated glass substrate of the prismatic mirror reflective element toward the driver monitoring camera is refracted in a first direction, and wherein the light is refracted in a second direction when passing through the refraction-compensating element, and wherein the second direction is opposite the first direction.

15. The vehicular interior rearview mirror assembly of claim 13, wherein a front side of the refraction-compensating element is parallel to a rear side of the wedge-shaped, reflector coated glass substrate of the prismatic mirror reflective element, and wherein a rear side of the refraction-compensating element is parallel to a front side of the wedge-shaped, reflector coated glass substrate of the prismatic mirror reflective element.

16. The vehicular interior rearview mirror assembly of claim 13, wherein the refraction-compensating element is disposed at a rear side of the wedge-shaped, reflector coated glass substrate of the prismatic mirror reflective element.

17. The vehicular interior rearview mirror assembly of claim 13, wherein the refraction-compensating element is disposed at the lens of the driver monitoring camera.

18. The vehicular interior rearview mirror assembly of claim 13, comprising a near infrared light emitter accommodated by the mirror head, wherein the near infrared light emitter moves in tandem with the mirror head.

19. The vehicular interior rearview mirror assembly of claim 18, wherein the near infrared light emitter, when electrically powered to emit light, emits near infrared light that passes through the prismatic mirror reflective element.

20. The vehicular interior rearview mirror assembly of claim 18, wherein the near infrared light emitter, when electrically powered to emit light, emits near infrared light that passes through the refraction-compensating element and the prismatic mirror reflective element.

21. The vehicular interior rearview mirror assembly of claim 13, wherein the driver monitoring camera views through a transflective mirror reflector of the prismatic mirror reflective element.

22. The vehicular interior rearview mirror assembly of claim 13, wherein the interior portion of the vehicle comprises a portion of a windshield at an in-cabin side of the windshield of the vehicle.

23. A vehicular interior rearview mirror assembly, the vehicular interior rearview mirror assembly comprising:

a mirror head adjustable relative to a mounting base, the mounting base configured to attach at an interior portion of a vehicle equipped with the vehicular interior rearview mirror assembly;

wherein the mirror head comprises a prismatic mirror reflective element;

wherein the prismatic mirror reflective element comprises a wedge-shaped, reflector-coated glass substrate;

a near infrared light emitter accommodated by the mirror head, wherein the near infrared light emitter, when electrically powered to emit light, emits near infrared light that passes through the prismatic mirror reflective element;

a driver monitoring camera accommodated by the mirror head, wherein the driver monitoring camera and the near infrared light emitter move in tandem with the mirror head when, with the mounting base attached at the interior portion of the vehicle, the mirror head is adjusted relative to the mounting base to adjust a rearward view of a driver viewing the prismatic mirror reflective element;

wherein the driver monitoring camera comprises an imager and a lens;

wherein the driver monitoring camera views through the prismatic mirror reflective element;

a refraction-compensating element disposed between the lens of the driver monitoring camera and the prismatic mirror reflective element;

wherein the refraction-compensating element comprises a wedge-shaped element;

wherein the refraction-compensating element offsets refraction of light that passes through the wedge-shaped, reflector coated glass substrate of the prismatic mirror reflective element;

wherein a lower edge region of the wedge-shaped, reflector coated glass substrate of the prismatic mirror reflective element is thinner than an upper edge region of the wedge-shaped, reflector coated glass substrate of the prismatic mirror reflective element, and wherein a lower edge region of the refraction-compensating element is thicker than an upper edge region of the refraction-compensating element; and wherein the light passing through the wedge-shaped, reflector coated glass substrate of the prismatic mirror reflective element toward the driver monitoring camera is refracted in a first direction, and wherein the light is refracted in a second direction when passing through the refraction-compensating element, and wherein the second direction is opposite the first direction.

24. The vehicular interior rearview mirror assembly of claim 23, wherein a front side of the refraction-compensating element is parallel to a rear side of the wedge-shaped, reflector coated glass substrate of the prismatic mirror reflective element, and wherein a rear side of the refraction-compensating element is parallel to a front side of the wedge-shaped, reflector coated glass substrate of the prismatic mirror reflective element.

25. The vehicular interior rearview mirror assembly of claim 23, wherein the refraction-compensating element is disposed at a rear side of the wedge-shaped, reflector coated glass substrate of the prismatic mirror reflective element.

26. The vehicular interior rearview mirror assembly of claim 23, wherein the refraction-compensating element is disposed at the lens of the driver monitoring camera.

27. The vehicular interior rearview mirror assembly of claim 23, wherein the near infrared light emitter, when electrically powered to emit light, emits near infrared light that passes through the refraction-compensating element.

28. The vehicular interior rearview mirror assembly of claim 23, wherein, with the mounting base attached at the interior portion of the vehicle, a processor processes image data captured by the driver monitoring camera to determine at least one selected from the group consisting of (i) driver attentiveness, (ii) driver drowsiness, and (iii) driver gaze direction.

29. The vehicular interior rearview mirror assembly of claim 23, wherein the driver monitoring camera views through a transflective mirror reflector of the prismatic mirror reflective element.

30. The vehicular interior rearview mirror assembly of claim 23, wherein the interior portion of the vehicle comprises a portion of a windshield at an in-cabin side of the windshield of the vehicle.

* * * * *